May 18, 1965

J. KURY 3,183,827

DEVICE ENSURING THE IMMOBILIZATION IN REGISTERED WORKING
POSITION OF BARS CONVEYING SHEET MATERIAL
IN A PLATEN PRESS

Filed Jan. 24, 1963

INVENTOR

JOSEF KURY

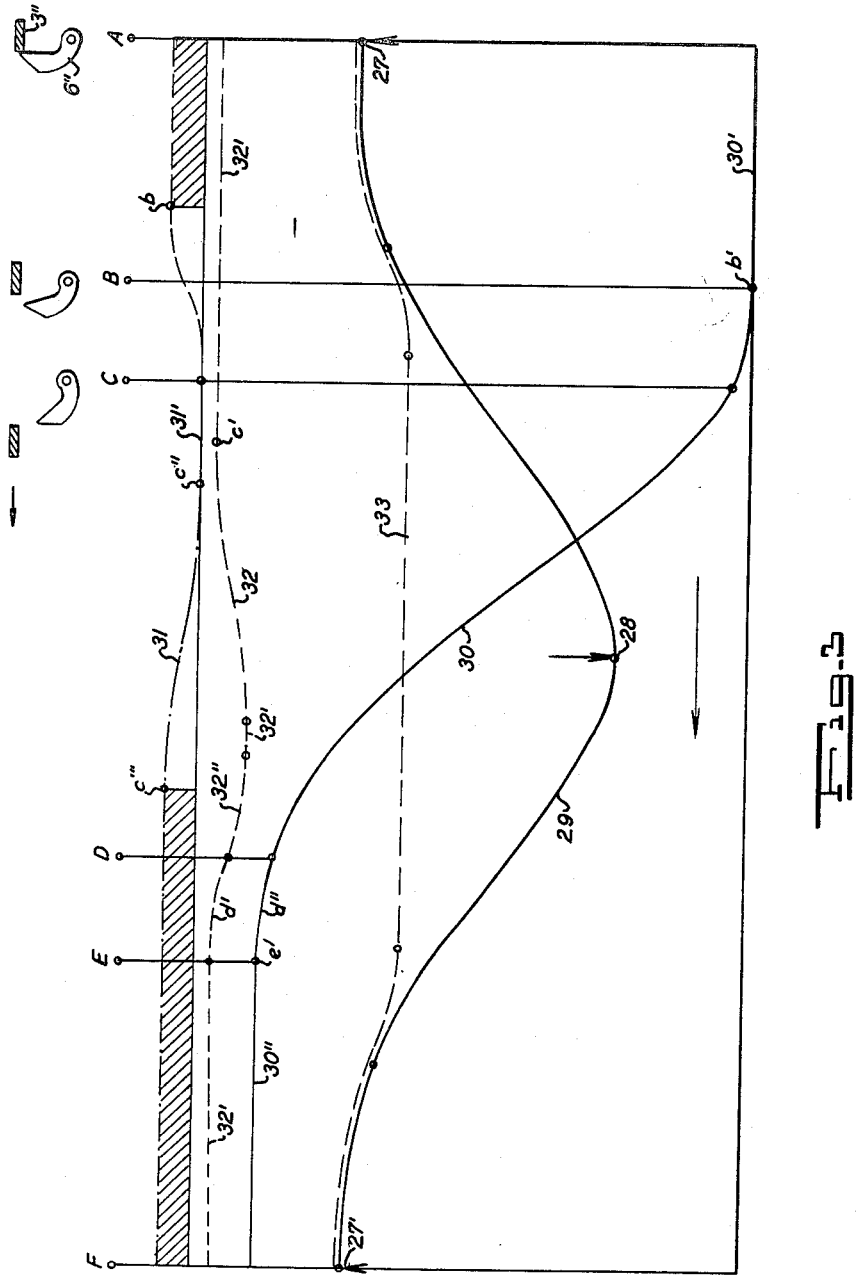

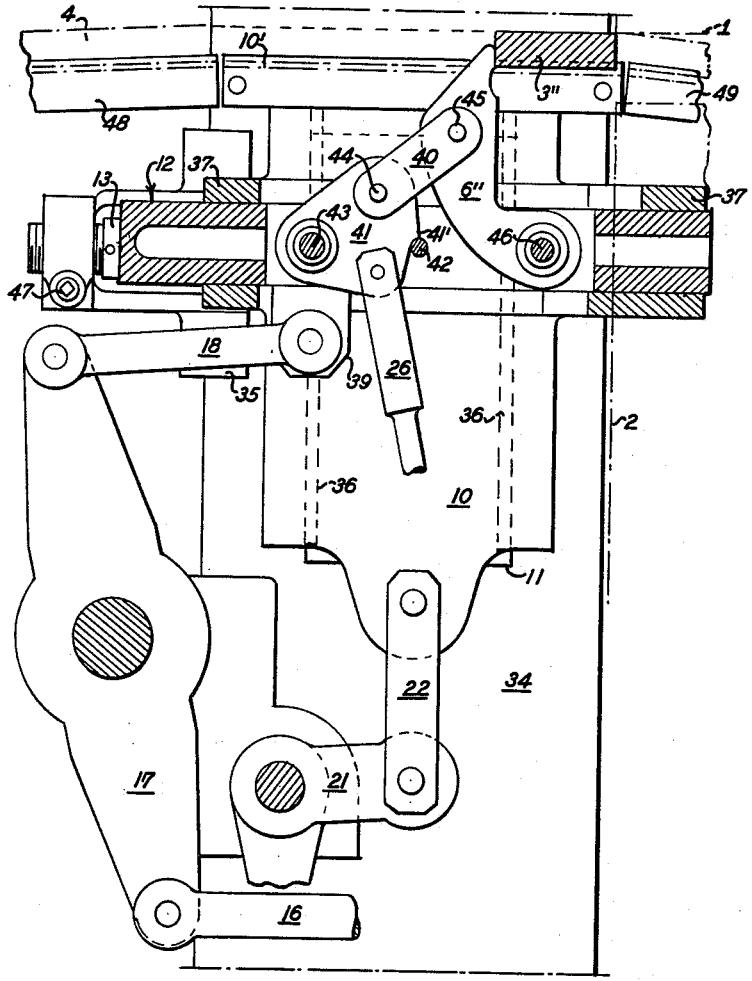
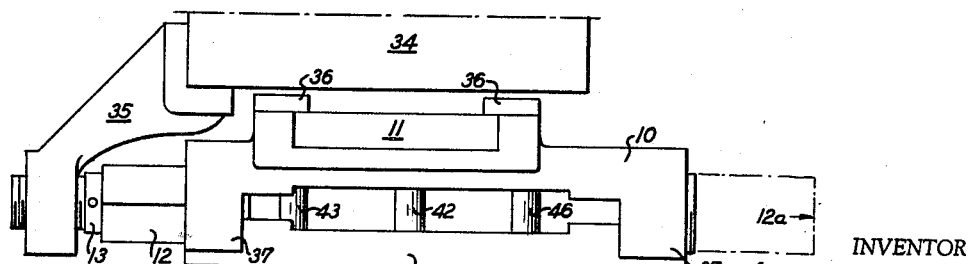

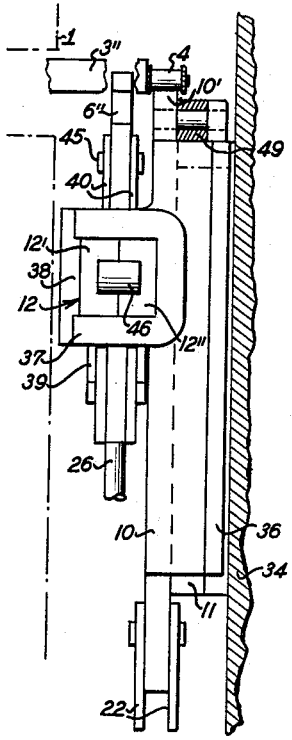

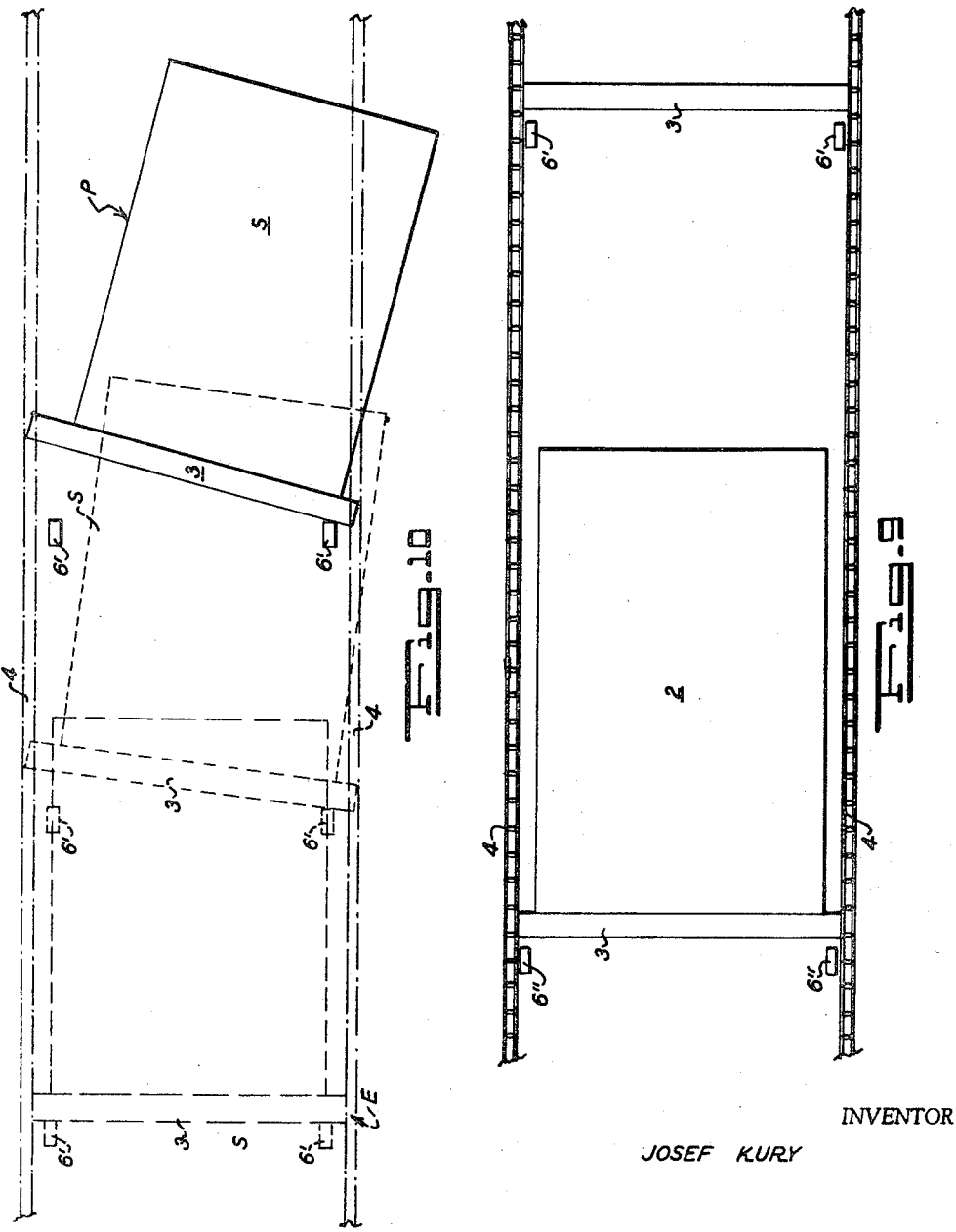

United States Patent Office 3,183,827
Patented May 18, 1965

3,183,827
DEVICE ENSURING THE IMMOBILIZATION IN REGISTERED WORKING POSITION OF BARS CONVEYING SHEET MATERIAL IN A PLATEN PRESS
Josef Kury, Pully, Switzerland, assignor to J. Bobst and Son SA., Prilly, near Lausanne, Switzerland, a corporation of Switzerland
Filed Jan. 24, 1963, Ser. No. 253,542
Claims priority, application Switzerland, Feb. 12, 1962, 1,760/62
9 Claims. (Cl. 100—215)

The present invention refers to a device for ensuring the immobilization in registered working position of bars transporting sheet material in a platen press.

Such a press will comprise a fixed upper platen, and a lower platten which is movable in alternating ascending and descending manner.

The sheet material to be processed, may be for instance paper or cardboard, which will be transported to the platens by gripper bars which are driven by a pair of endless chains.

It is an object of the invention to improve the advancement of the bars.

It is a specific object of the invention to properly orient the gripper bars and the material transported gradually therewith as they advance along their path.

Two positions of the gripper bars are important, one being when each bar stops and seizes a sheet, and the other being when each bar stops and maintains the previously seized sheet in the so-called working position for operation by the platens. At that time, the movable platen is moved towards the fixed platen. The bars and sheets pass between the platens while they are moved apart.

The positions of the bars when the latter stop and seize a sheet and when they stop to position the sheet between the platens are generally established by pairs of stops, which are movable out of the path of the bars when the platens are moved apart to allow free passage of the bars.

The chains, bars and chain wheels form an assembly presenting a substantial inertia which requires a suitably powerful mechanism to alternately drive and stop the assembly.

In particular, the stopping of the bars takes place against the stops which are submitted to stresses limiting to a certain extent the highest working speed of the press.

In order to diminish these strains and to make it possible to increase simultaneously and without inconvenience the working speed of the press, the device according to the invention provides, at the working station, for two stops coupled to the driving members of the press, so as to accomplish the following motions: a setting of the stops into the trajectory of the bars each time a bar engages between the platens and shifting in opposite direction to that of the engaged bar, followed by an arrest and a backward motion of the stop adjusted in such a way that at the moment the bar and the stop come into contact, both are displaced, the stops taking part in the deceleration of the bar until its immobilization in the required registered working position, then a displacement of the stops outside the trajectory of the previously engaged bar, so as to permit its removal with the processed sheet, the displacement being followed immediately by a new setting of the stops into the trajectory of the bars and a repetition of the already described operations.

The motions in question are, for instance, realizable by placing each stop on a pivot around which a first mechanism will make it oscillate, so as to raise and lower it. By arranging the pivot on a member which is slidable in a direction parallel to the shifting direction of the bars, said member can be driven by a second mechanism reciprocally in the shifting direction of the bars and opposed thereto. The slidable member may be raised and lowered by a third mechanism in synchronism with the movable platen. Each of the aforementioned three mechanisms can be governed by a respective cam and the three cams can be driven by the driving members for the press and the conveying bars. The lifting and lowering of the last element mentioned can finally serve to lift periodically a corresponding portion of the chain.

A major advantage of the device lies in the fact that any bar which, as a consequence of uneven elongations of the pair of chains which drive the bar would move forward obliquely, is brought back to a perpendicular direction while it is still in motion, along with the sheet it conveys and which, in this connection, will accomplish with greater facility a rotation in its plane.

An embodiment of the invention is illustrated in the attached drawings, wherein:

FIGURE 3 is a diagram showing curves which represent in detail the operation of the device as a function of time;

FIGURE 4 is an elevation view of the main elements of the device just at the moment a conveying bar is immobilized in registered working position, resting against the stops;

FIGURE 5 is a side view of the elements of FIG. 4;

FIGURE 6 is a view of a portion of the elements of FIG. 4 as viewed from above;

FIGURES 7 and 8 are simplified views (to a larger scale) showing the stop and the bar in two positions in time-wise sequence after that shown in FIG. 4;

FIGURE 9 is a schematic plan view of a detail of the press taken along line IX—IX in FIG. 1, showing the pair of chains and the bars connected to the chains; and FIGURE 10 is a diagrammatic plan view showing the operation of the control of the bar by the stops.

FIGS. 3–8 show only the stop located behind the platens for purposes of simplification.

Figure 1:
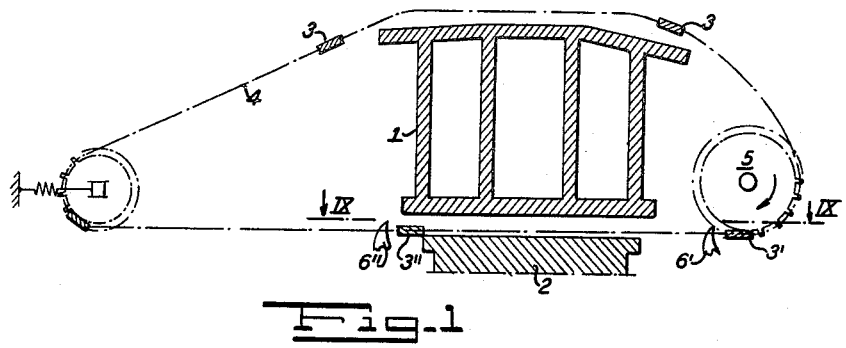
FIGURE 1 is a diagrammatic overall view of the platen press.

FIG. 1 shows the upper fixed platen 1, and the lower movable platen 2. The gripper bars 3 driven by the chain 4 engage the sheet to be processed to advance the same between the platens.

It is to be seen from FIG. 9 that a pair of chains 4 are employed and that the gripper bars 3 are connected at their ends to the chains 4. The chains 4 are driven by the sprocket drive wheel 5 in the direction of the arrow shown thereon in FIG. 1.

Figure 2:
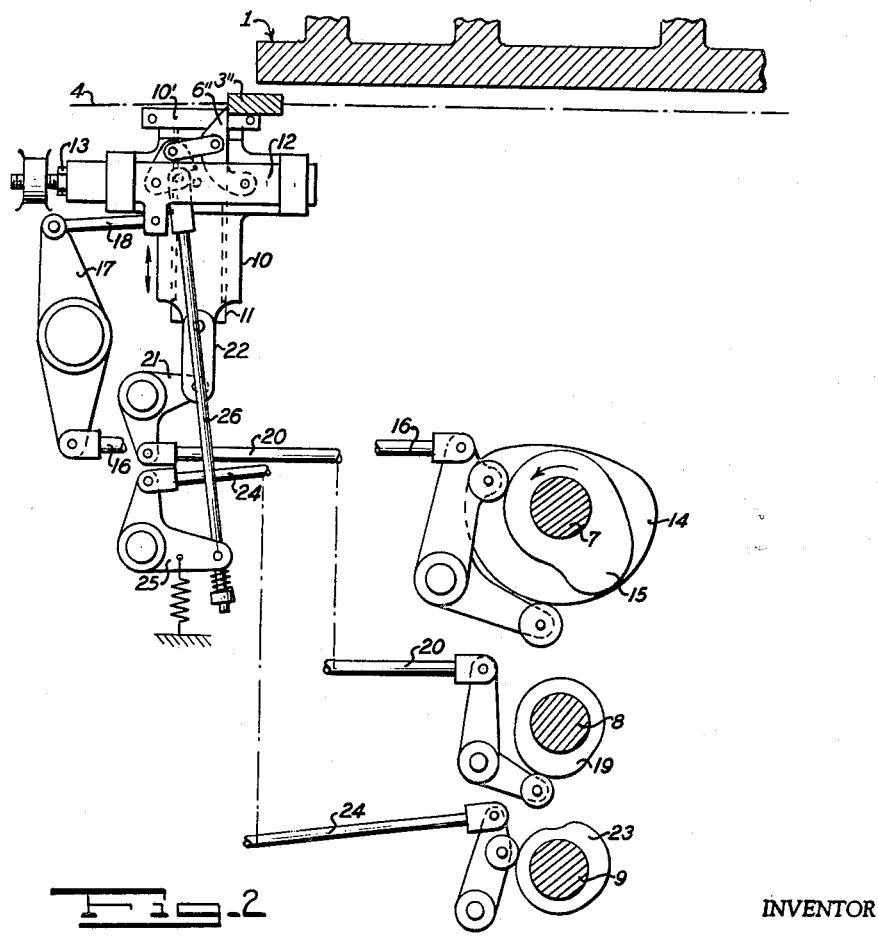
FIGURE 2 is a diagrammatic view of a detail of the press shown in FIG. 1, serving to explain the principal functions of the arrangement of the device shown.

In FIG. 2 the upper platen 1 is shown, and the conveying bar 3″ is shown in working position in which a sheet is ready to be processed by the platen. The chain 4 is shown in dot-dash line.

Furthermore, three shafts 7, 8, 9 are shown in section. Practically, a single shaft may be provided for, however, three shafts are shown for convenience of the graphical representation in order to explain the operation of the means supporting the stop. The three shafts turn in the direction of the arrow accompanying the shaft 7, driven by the mechanism of the press at the rate of one revolution for each working cycle of the latter, thus establishing a relation between the press and the hereafter described device.

This latter device consists mainly of a cradle 10 of T shape, which can be raised and lowered perpendicularly to the working plane of the press, that is in the direction of the displacement imparted to the movable platen which is not shown in FIG. 2. This cradle is supported by a fixed piece 11, integral with the press frame and forms a slide for a partly hollow bar for movement parallel to the aforesaid working plane. The partly hollow bar 12 supports shafts of members adapted to pivotally move the stop 6″. An adjustable stop element 13 limits the motions of the bar 12 in one direction. The stop element 13 is fixed to the press frame.

The cradle 10 undergoes ascending and descending motion synchronously with the displacements of the lower movable platen.

The bar 12 makes it possible to displace the stop 6″ in the conveying direction of the bar 3″ or opposite thereto, this stop being finally joined in such a way that it can be pivotally moved to an erect position (represented position) or to a lowered position.

These motions are governed by cams located on the shafts 7, 8, 9.

Thus, the cams 14, 15 of the shaft 7 operate the rod 16, the lever 17 and, through it and the connecting rod 18, the bar 12, which moves to and fro in the cradle 10.

The cam 19 of the shaft 8 operates the rod 20 which, through the lever 21 and the connecting rod 22, causes the cradle 10 to go up and down.

Finally, the cam 23 of the shaft 9 causes the stop 6″ to oscillate by means of the rod 24, the lever 25, the rod 26 and other members which will be described further in detail.

In addition, the cradle 10 supports a horizontal bar 10′, which undergoes concurrent ascending and descending motions with cradle 10 and is effective for thus raising the chain and the bar 3″ therewith at the same time as other members which will be dealt with further.

There is now described, on the basis of the diagram of the FIG. 3, the exact order in which the already described operations occur.

The abscissa of the diagram in FIG. 3 are to be read from right to left and represent the time of the press working cycle between an upper dead point 27 of the movable platen and the return to that upper dead point at 27′. The curve passes through the lower dead point 28, and the curve 29 of sinusoidal aspect represents the motion of that platen.

The curve 30 corresponds to the displacements of the conveying bars between the platens, in particular of the bar which passes therein during the represented cycle. The ordinates corresponding, for the platen and the bar as well, to the covered travel, it appears that the bar having seized a sheet while the press is processing another one, is at that moment motionless at 30′, such as this will also occur with the bar securing the already processed sheet. Then the curve rises, representing an acceleration of the bar while the platens are moving apart from each other, reaching a maximum speed, then slowing down in its movement for being immobilized at 30″, before the setting under pressure (upper dead point 27′) corresponding for instance to the cutting of the conveyed sheet.

During the immobilization of the bar in question at 30″, which lasts in reality the time which the sum of the two horizontal sections 30″ and 30′ represent, a new bar seizing a new sheet is ready to start the cycle again at 30′.

It has been shown that the stop 6″ can oscillate, be pulled against the bars or on the contrary, lowered in the direction of the displacement of the latter. The curve 31 expresses this function. Therein, the motions are read vertically, which indicates that the stop is completely raised during the fractions of the cycle presenting hatchings in broken lines, while it is completely lowered on the horizontal rectilinear section 31′.

Thus, the stop is, as it appears, normally pulled up during the period of immobilization of the chains and of the bars and lowered by being tipped backwards while a bar is undergoing displacement between the separated platens.

But the stop performs still another motion, a reciprocating one parallel to the shifting direction of the bars. This motion is also read vertically on the curve 32 in the sense that the stop is motionless during the times occupied by the horizontal sections 32′, supposed to go forward against the bar in motion there, where the descending section is facing the reference 32 and to be moved, on the contrary, in the direction of the bar during the ascending section 32″.

Analyzing these data by considering the whole diagram, the following main points are distinguishable:

At A, the stop 6″ is raised, is motionless (32′) and secures a bar 3″ which is likewise motionless, while the lower platen is under pressure at its upper dead point 27, the press accomplishes its working operation, for instance, a cutting of the sheets.

At B, the stop is already partly tipped backwards (motion started at b), the movable platen is already lowered a little and the chains and bars are at the point b′ of impending motion.

At C, the stop is completely tipped down (during all the horizontal section 31′), the lower platen accelerates its descending motion and the chain and bars have begun translation. A little later in time (at c′) the stop is set into motion agains the bar engaged between the platens. This movement continues until 32′, where there is a momentary arrest. The stop is still tipped down and is just beginning to raise from the point c″, when it comes into contact with the bar. After this momentary arrest, the stop travels in the same direction as the bar, while it is completely raised at c‴.

These latter motions are set, so as to cause the stop to accompany the bar to D, where the bar and stop come into contact without impact and are displaced together, the bar coming to rest against the stops (section of parallel curves d′ and d″). The opposite direction of the hatchings in broken lines on either side of D indicates the period where the raised stop is displaced alone and that where it is displaced while assisting the motion of the bar it secures. Meanwhile, the movable platen has passed from its lower dead point 28 and accomplished a major part of its ascending motion.

Finally, at E, the chains and bars stop e′ at the chains and bars stop e′ at the same time as the stop 6″ is immobilized in registered position by the adjustable stop element 13 (see FIG. 2). The correct position of the bar and the sheet to be processed is ensured.

At F, the upper dead point 27′ of the movable platen is reached and the working operation is going on.

The diagram already described shows another curve 33 in dash and dotted line. It represents the ascending and descending motions of the cradle 10 of FIG. 2, supporting the elements bringing about the previously described motions of the stop 6″. It appears, that on either side of the upper dead point 27 of the platen, this curve follows the movement of the latter and ending in a horizontal central period representing immobility. When observing the drawing, it can be said that the cradle 10 is moving with the movable lower platen on about the last seventh (active side) of its whole travel.

FIG. 10 shows diagrammatically the relationship between the stops and bar 3 and the effect on the sheet engaged by the bar. As seen in FIG. 10, the sheet S is transported in an assumed oblique state to the position P and while it is still moving, the stops 6′ are positioned where one of them is contacted by the gripper bar 3. Immediately thereupon the stops begin moving with the gripper bar, but their movement is slower relative to that of the advancing gripper bar. During their longitudinal movement the sheet S and the bar 3 swing through an intermediate position shown in dotted lines to end their movement at the aligned end position E.

As already mentioned with respect to the horizontal bar 10′ of the FIG. 2, the conveying chain and with it the conveying bar participate in this motion, the aim of which is, after each shifting of a sheet to be processed in working position, to raise this latter up to the level of the plane in which it will be tightened between the tools, which position the conveying bar ought not occupy during its passage between the platens. At that moment, it should on the contrary be lowered to a level allowing this passage.

There is now shown with reference to FIGS. 4 to 8, a practical embodiment of the device according to the invention. The joining screws of the various pieces tied to each other have not been illustrated for simplification purposes.

In addition, all the references of the FIG. 2 are applied to the corresponding elements in FIGS. 4 to 8.

In FIG. 4 there is shown a stationary pillar of the frame of the press. In relation to FIG. 1, the pillar 34 would be located behind the left end of the platens 1 and 2, the position of which is shown in dash and dotted lines FIGS. 4 to 6.

There is supported on the pillar 34 the fixed piece 11 which supports the cradle 10 for ascending and descending motion. There is also supported on the pillar 34 through a fixed bracket 35 which supports the stop element 13. The piece 11 and the bracket 35 are thus at rest, while all the remaining elements are movable.

The cradle 10 is composed of two tongues 36 securing it to the piece 11 and a horizontal member 37 (the T head) formed in the outline of a U and having longer branches at both ends (FIG. 6) which support and guide the bar 12 retained by a lid 38 secured by convenient means as, for instance, screws at the longer ends of the U-shaped members 37.

Between these longer ends, a gap extends lengthwise between each of the flanges of the member 37 and the lid 38.

The gaps allow passage of the stop 6″ and the members driving it, as well as the flanges 39 of the bar 12, to which the connecting rod 18 is articulated.

The bar 12 is made itself of two pieces 12′, 12″ (see FIG. 5) joined side by side and enclosing between them the members already referred to and their axles of rotation. In FIG. 6, these axles alone appear in the gap formed by the upper flange of the member 37 and the lid 38. The elements which are supported by the axles have been eliminated for simplification of illustration in FIGS. 5 and 6.

The connecting rod 26, as appears in FIG. 4, controls the stop 6 through the small connecting rod 40 and a shaped plate 41. This latter is formed in such a way as to present a nose 41′ adapted for resting in a raised position of the stop, against an axle 42. In this position, the axle 43 of the plate 41, the pivot 44 from the connecting rods 40 to the plate 41 and the pivot 45 connecting the connecting rods 40 to the stop 6″ are in alignment. This represents a dead point position which confers to the assembly great rigidity in relation to the pressure exerted by the conveying bar 3″ against the stop. Such rigidity is indispensable for fixing the position of this bar accurately. It will even be advantageous to exceed this dead point position, so as to cause the nose 41′ to forcibly contact the axle 42 very slightly.

The stop 6″ turns, on its own, around the pivot 46.

FIGS. 7 and 8 show the positions of the elements already described with respect to stop 6″. When the latter is partly overturned in FIG. 7, at the moment the conveying bar 3″ is ready to be set into motion (point B of the FIG. 3) and, in FIG. 8, when the stop is completely overturned, the bar has already started its travel (point C of FIG. 3).

According to another constructive detail, the adjustable stop element 13 which is screwed in the bracket 35 in order to be able to adjust the position of the bar 12 and thereby the stop 6″ accurately, can be locked by the tightening screw 47 (see FIG. 4), so as to guarantee a secured position for the element 13.

The foremost position of the stop against the conveying bar portion 32′ between C and D of the displacement curve of stop 6″ (in the curve of FIG. 3) corresponds to an advance of the bar 12 to the position 12a shown in FIG. 6.

It is to be understood that there are symmetrical frame pillars 34 on either side of the press, supporting identical symmetrical mechanisms. Thus, the stops 6″ at either side of the platens of the press and the position of both ends of the conveying bars will be exactly registered and the two chains driving the bars will be raised and lowered by the bars 10′ of the associated cradles.

FIG. 4 shows that to bar 10 are articulated two rails 48 and 49, the height of the free ends of which is fixed. Thus the rails will constitute gradients guiding each chain. In FIG. 5 the pivoted end of the rail 49 appears in section.

What I claim is:

1. In a platen press having a fixed platen and a movable platen adapted for being driven in alternating fashion towards and away from the fixed platen, a pair of driven chains, a plurality of bars coupled between the chains at spaced intervals for being driven thereby in synchronism with the movement of the movable platen to successively position a sheet element between the platens with the latter separated, stops for engaging the bars, and means supporting said stops for reciprocal and pivotal movement in spatial relation with the chains to cause said stops to engage said bars and travel therewith to guide said bars as the latter are driven by said chains and to hold said stops fixed in position as the bars occupy a position in which the associated sheet element is placed between the platens.

2. In a platen press as claimed in claim 1 wherein said means supporting said stops comprises means pivotally supporting the stops at the level of the bars to enable the stops to be moved between an erect pivotal position in which the stops lie in the path of the bars and a lowered pivotal position in which the stops lie outside the path of the bars, and means slidably supporting the stops for reciprocal movement in a direction substantially parallel to the direction of travel of the bars.

3. In a platen press as claimed in claim 2 wherein said means supporting said stops further comprises means for raising and lowering the stops with respect to the fixed platen.

4. In a platen press having a fixed platen and a movable platen adapted for being driven in alternating fashion towards and away from the fixed platen, chain driven bars for successively engaging sheet material and transporting the same between the platens, stop means for guiding said bars as the same advance towards said platens with the sheet material and for stopping said bars when the same have transported the associated sheet material to a position between the platens, and means supporting said stop means for reciprocal movement in a direction parallel to the direction of travel of the bars, for pivotal movement into and out of the trajectory of the bars as well as for elevating and lowering motion with respect to the trajectory of the bars, all in synchronism with the movement of the lower platen to first set the stop means in the path of the bar, then move the stop means along with the bar with the latter in contact with the stop means to slow the movement of the bar until the bar has moved to a position in which the sheet material engaged thereby has been introduced between the platens whereafter the stop means is stopped to terminate movement of the bar for a period as long as the operation of the platens on the sheet material and then the stop means is pivotally moved out of the trajectory of the bar to allow the latter to proceed and the stop means is then moved backwardly to the original position thereof and pivotally moved into the trajectory of the bar for cooperating with the next bar and sheet therewith to be advanced to the platens.

5. In a press as claimed in claim 4 wherein said means supporting said stop means comprises a slide reciprocally supported for movement in a direction parallel to the trajectory of the bar, a cradle supporting said slide and movable in a direction for being raised and lowered with respect to the trajectory of the bar, an adjustable stop element adapted for being fixed in the path of the slide for limiting the displacement thereof in the direction in which the bar is fed towards the platens, means pivotally supporting the stop means on the slide for movement between an elevated and a retracted position, and means for driving the cradle, the slide and the means pivotally supporting the stop means, all in synchronism with one another and with the movement of the lower platen.

6. In a press as claimed in claim 5 wherein said means for driving the means pivotally supporting the stop means comprises a linkage having aligned pivots with the stop means in an elevated position to provide a dead point position.

7. In a press as claimed in claim 6 wherein said linkage comprises a shaped plate, a pivot supporting said shaped plate from the slide, a link having opposite ends, and pivots at said ends respectively connecting the link to the shaped plate and to the stop means, said pivots at the ends of the links and the pivot connecting the shaped plate to the slide being aligned in said dead position.

8. In a press as claimed in claim 5 wherein said means for driving the cradle, the slide and the means pivotally supporting the stop means comprises three cams each respectively associated with the cradle, the slide and the means pivotally supporting the stop means, to reciprocate the slide, raise and lower the cradle and elevate and retract the stop means and means coupled to the cams for driving the same in relation to the movement of the lower platen of the press.

9. In a press as claimed in claim 5 comprising a guide having opposite ends supported in the cradle and over which is adapted to be passed the chain which drives the bars, a rail connected to the guide at each of the opposite ends thereof for forming gradients for leading the chain over the guide.

References Cited by the Examiner

UNITED STATES PATENTS

| | | | |
|---|---|---|---|
| 1,032,489 | 7/12 | McCann | 100—215 |
| 1,150,636 | 8/15 | Sheehan | 100—35 |
| 2,181,060 | 11/39 | Leonard | 100—215 |
| 2,338,456 | 1/44 | Pizzi | 100—35 |
| 2,418,065 | 3/47 | Bobst | 271—79 X |
| 2,829,890 | 4/58 | Kury et al. | 271—79 |

FOREIGN PATENTS

| | | |
|---|---|---|
| 769,251 | 3/57 | Great Britain. |
| 769,253 | 3/57 | Great Britain. |
| 1,030,165 | 5/58 | Germany. |
| 905,719 | 4/45 | France. |

WALTER A. SCHEEL, *Primary Examiner.*

CHARLES A. WILLMUTH, *Examiner.*